Dec. 29, 1964
W. F. CHAMPE
3,163,587
DISTILLATION APPARATUS FOR CONVERTING
SALT WATER INTO FRESH WATER
Filed Dec. 13, 1960
2 Sheets-Sheet 2
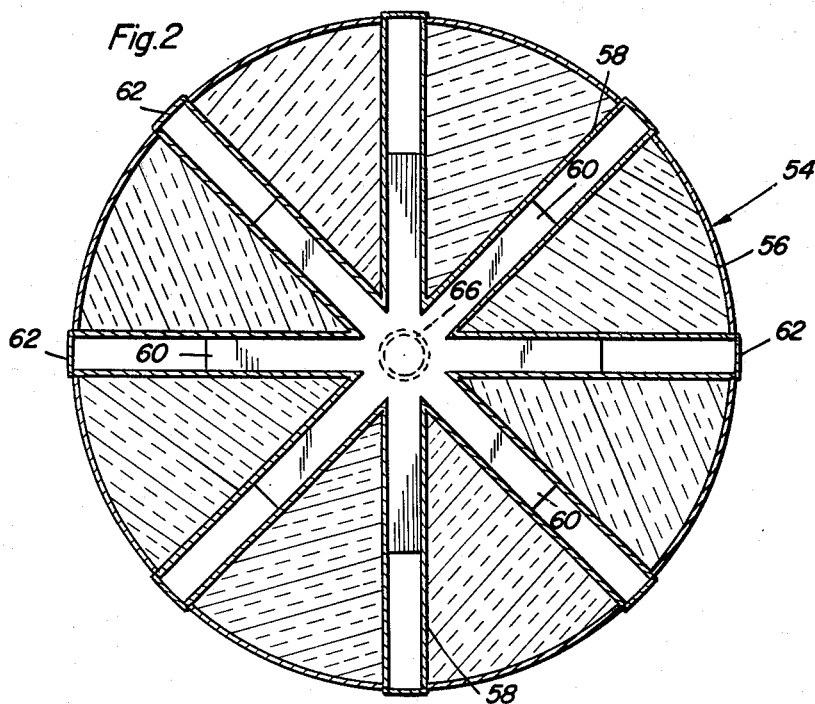
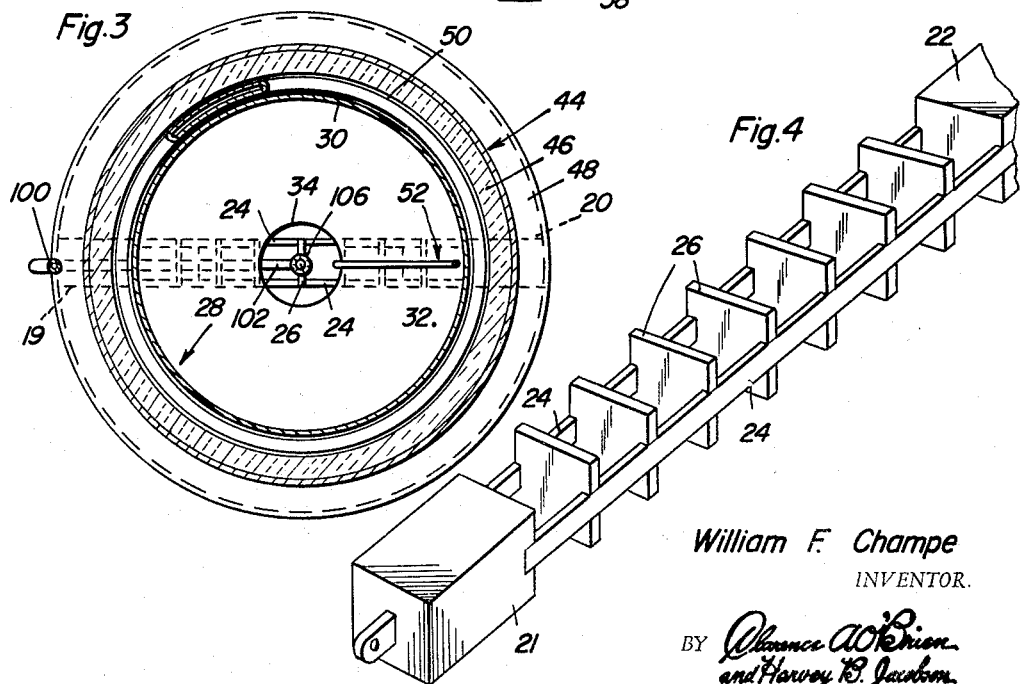
William F. Champe
INVENTOR.
BY *Clarence A. O'Brien*
*and Harvey B. Jacobson*
Attorneys

United States Patent Office 3,163,587
Patented Dec. 29, 1964

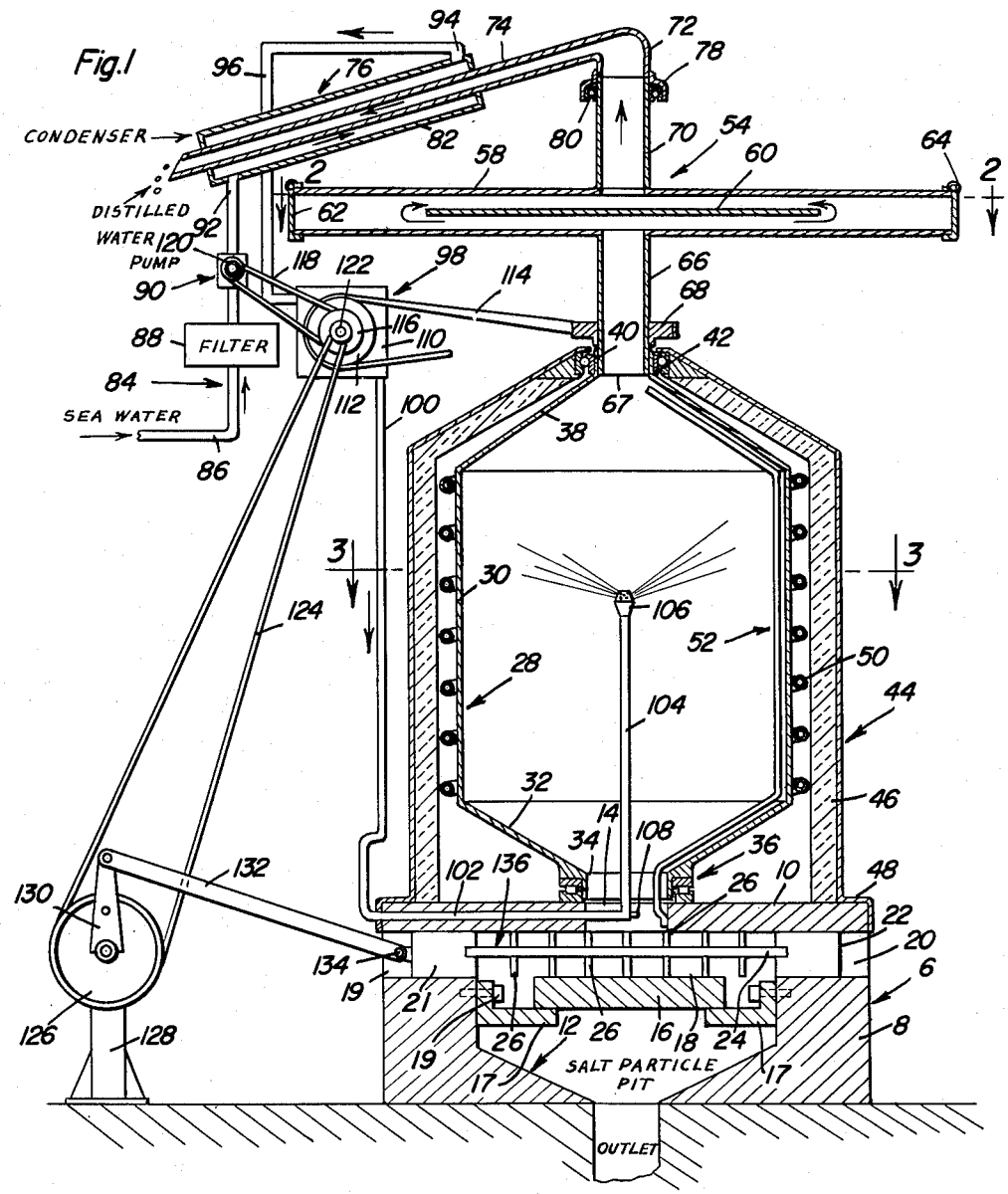

3,163,587
DISTILLATION APPARATUS FOR CONVERTING
SALT WATER INTO FRESH WATER
William F. Champe, R.F.D. 1, Box 209, Culloden, W. Va.
Filed Dec. 13, 1960, Ser. No. 75,509
9 Claims. (Cl. 202—176)

This invention relates to a novel and improved apparatus which is designed and constructed to effectually and reliably convert salt laden sea water into fresh safely usable drinking water.

In carrying out the present invention a simple construction and arrangement of practical component parts is utilized. Briefly summarized the apparatus is characterized by an outer stationary housing, a drum mounted for rotation at a prerequisite speed within the confines of said housing, means in said housing cooperating with and for heating said drum, a salt water delivery conduit leading from a source of supply into said drum and having a distributive-type spray nozzle centralized within a median area of the confines of said drum, a suitably positioned and inclined condenser, salt particles separator means rotatably supported and affording communication between a vapor discharge end of said drum and said condenser, and a pump mounted in said conduit between the salt water intake thereof and a salt water intake end of said condenser.

A suitable conduit which supplies the salt water such as sea water is connected with an intake end of a condenser and this conduit is provided with a filter and also a suitable pump driven from an appropriate prime mover, for example, a water-cooled motor. The same motor performs additional functions which will be clarified as the description proceeds. A second conduit serves to feed and deliver salt water from a discharge end portion of the condenser and terminates in a spray head located at the central area portion of the vaporizing chamber of the rotating drum. The motor is incorporated in the second conduit whereby the incoming water serves to cool the motor by absorbing heat therefrom. The drum is heated by encircling electrical heater coils or equivalent coils heated by gas, oil, or coal flame from any available source of fuel. The spray is vaporized immediately on contact with the surfaces of the heated rotating drum, which rotates to insure an even distribution of the water film. Consequently, most of the salt is deposited on the inside surface of the drum.

The invention also includes a stationary scraper located within the confines of the drum and cooperating with the wall surfaces causing solid matter, the salt particles, to fall into an opening leading to an accumulating recess or pit in a base which supports the housing and drum.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a diagrammatic view of the entire apparatus with parts appearing in section and elevation.

FIG. 2 is a horizontal section on the line 2—2 of FIG. 1 looking in the direction of the arrows.

FIG. 3 is a horizontal section on the line 3—3 of FIG. 1.

FIG. 4 is a view in perspective of the shaft and piston means seen on the smaller scale at the bottom of FIG. 1.

With reference first to FIG. 1 the numeral 6 designates a base of suitable size and construction. This part may be assumed to be circular in cross section and includes a lower body portion 8 and a flat surfaced top portion 10. The recess 12 defines a pocket-like pit for trapping and discharging the trapped salt particles. The central portion of the top is provided with an opening 14 communicating with the pit. On the interior and directly beneath this opening a rectangular block-like baffle 16 is provided, the top surface 18 thereof being in alignment with axially aligned bores 19 and 20 which provide cylinders for cooperating reciprocable pistons 21 and 22. The baffle 16 may be supported in any suitable manner, as by being carried upon bracket 17 secured as by fasteners 19 to the wall of the pit in the lower body portion 8. As shown in FIG. 4 these pistons are at the end portions of a shaft made up of horizontal spaced parallel bars or equivalent members 24 provided with rectangular longitudinally spaced vanes 26. The pistons 21 and 22 are rectangular in cross section as are the bores or so-called cylinders 19 and 20 in which they have controlled operation. This aspect of the construction will be later referred to.

Taking up now the aforementioned rotating vaporizing drum, this is denoted as a unit by the numeral 28 and it comprises a cylindrical shell or body portion 30 cooperating with truncated conical upper and lower ends. The conical lower end 32 terminates in an annular discharge opening encircled by a collar 34 rotatable in suitable bearing means 36 provided therefor at the top of the base. This discharge opening 34 registers with the opening 14 allowing the gravitating particles to descend upon the top surface 18 of the baffle block 16. It will be noted in this connection that the end portions of the block 16 terminate in spaced relation from the walls of the pit to allow the scraped particles to descend into the pit. The conical portion 32 also functions as a funnel to assist in funnelling the particles into the opening 14. The upper conical truncated end 38 also terminates in an annular collar 40 which is rotatably journaled in bearing means 42 provided at the upper truncated end of the drum housing 44. This housing is heavily insulated on its interior as at 46 and the lower flanged portion 48 is suitably constructed and supported atop the base 6. The heating coils are denoted at 50 and they encircle the drum and subject the same to the desired degree of heat.

Attention is now directed to the stationary scraper 52. This comprises a rod or bar which is shaped to conform to the component surfaces of the drum with which the scraper cooperates. The lower end is suitably fixed to the base in the manner shown.

The numeral 54 designates a rotating unit which is here referred to as an insulated centrifugal salt particle separator head. This head comprises a shell or casing 56 (FIG. 2) which encases a plurality of open-ended horizontal radial tubes. Each tube is the same in construction and one such tube is shown in FIG. 1 where it is denoted by the numeral 58. It will be noticed that a baffle plate 60 is secured at its sides in the bore of the tube with its end portions terminating inwardly of the openable and closable outer ends of the tube as shown in FIG. 2. Suitable flaps or doors 62 are provided at the outer ends and are hingedly mounted at 64. Depending from and communicating with the central hub portion of the overall head is a tubular neck 66 the lower end 67 of which is telescoped into and friction-connected with the collar 40, whereby the head 54 and drum 28 may be simultaneously rotated. The neck 66 is provided with a pulley 68. The upstanding axially aligned neck 70 is separably connected with an elbow 72 forming a part of an inclined duct 74 which in turn constitutes a component part of the inclined condenser 76. It will be noticed in this connection that the depending elbow 72 is provided with a cup-like canopy 78 containing bearing means 80. The horizontally elongated body or shell 82 of the condenser permits passage therethrough of the inclined duct 74 from the discharge end of which the distilled water is emptied into a suitable container or receptacle (not shown).

Attention is now directed to the sea water delivery conduit 84 at the left in FIG. 1. The intake end is denoted at 86 and adjacent thereto in the vertical branch a suitable filter 88 is embodied. There is also a motor driven pump at 90. The upper end 92 is joined to the intake end of the condenser 76.

Attention is next directed to the salt water feeding and delivery conduit, one end portion 94 of which is connected to the discharge end of the condenser. Then, the portion 96 is connected to the housing of the primer mover or motor 98. The extended portion 100 extends down alongside the housing, has a horizontal extension or branch 102 which joins to a vertical terminal portion which may be called a standpipe 104 and this terminates in a spray head or nozzle 106. At the juncture of the portions 102 and 104 a bleed valve 108 is provided and this serves a purpose to be later described.

The housing of the motor is denoted at 110 and will be of suitable construction. The motor shaft drives a sheave or pulley 112 which, in turn, operates an endless belt 114 which drives the aforementioned pulley 68. A second pulley 116 on the motor shaft drives a belt 118 which operates the pump pulley 120. The smaller pulley 122 on the motor shaft operates an endless belt 124 which, in turn, operates a drive wheel 126 mounted on the stand 128. The drive wheel is provided with an eccentric arm or crank 130 which operates the push-pull pitman 132. The pitman is pivotally connected at 134 to the adjacent piston 21. In operation it will be evident that the spray from the spray nozzle 106 is vaporized immediately on contact with the wall surfaces of the hot rotating drum 28. The drum rotates to insure an even distribution of water film. Most of the salt is deposited on the interior surface of the drum and this is scraped off by the stationary scraper 52. The salt particles fall into the openings 34 and 14 where they are scraped into the pit or compartment 12 by the blades or vanes 26 on the reciprocating shaft and piston unit 136. As is evident, this unit 136 is reciprocated by the pitman 132 which receives its motion from the drive wheel 126. Considering the nature and cooperation of the bores 19 and 20 and the pistons 21 and 22 operating therein it will be evident that this means assists in maintaining a positive pressure on the system forcing the vapor up against the baffle plate 60. The positive pressure forces the vapor around the ends of the baffle plate (as indicated by the arrows) and through the tubular neck 70 into the condenser 76 in the manner illustrated. Here the vapor is condensed to liquid and runs into a storage tank (not shown).

When the salt water is sprayed against the drum 28 some of the salt particles, due to their small size, are carried with the vapor up against the baffle plate 60. They would, unless blocked, pass on into the condenser water. The salt particles are removed by centrifugal force brought about by the horizontal rotating tubes 58 embodied in the aforementioned centrifugal head 54. In actual practice some eight tubes are used. Then, too, the small salt particles are thrown against the hinged closures or doors 62 and when sufficient of a build up is attained the doors are swung to open particle-freeing positions.

For better cleaning the entire head or unit 54 may be dismantled from the points 78 and 68 and promptly replaced with another correspondingly constructed unit.

Positive pressure is induced by the evaporation of water spray into vapor or steam. So long as the conversion of water-to-vapor proceeds the pressure will remain positive, provided that the loss is less than the developed pressure. The two end pistons 21 and 22 at the bottom of the converter are spaced so there will be no open passage from the spray tank to the outside, except through the condenser at the top. When one piston 26 passes to the right or left, another piston will make contact and seal the system before the opening in the bottom of the reciprocating shaft channel is reached.

The block 16 over the outlet 14 for salt deposits is extended on both sides of the opening 14 a distance equal to one and one-half (1½) times the spacing between the pistons. This makes a total of five pistons in contact with the block at one time. The shaft and pistons are reciprocating at a speed just great enough to remove the accumulation of salt deposits. There will be a slight loss of pressure, but this will be negligible relative to the amount produced. The bleed valve 108 in the spray line facilitates the removal of salt deposits by allowing some sea water to pass into the reciprocating shaft cylinders 19 and 20. This will help to maintain seal and cut down on the abrasive qualities of the salt.

In addition to the fact that the construction offers substantially continuous operation it will be evident that no blow-down is necessary to remove concentrated salt water solution. Therefore, hot water is not discarded with large attending heat losses.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for converting sea water into fresh water comprising: a base having a recess providing a solid material trapping pit, the central upper portion of said base having an opening registering with the pit, a baffle block fixed in said pit and underlying and spaced below said opening and of a length greater than the cross-section of said opening, a reciprocating shaft having pistons thereon slidingly mounted in bores provided therefor in the base in a plane between the top of the baffle block and bottom of said opening, an insulated housing supported on and rising above the top of the base, a heated scraper-equipped vaporizing drum confined in said housing, said drum having a truncated open bottom mounted for rotation atop the base, said truncated bottom being aligned with and serving to funnel and deliver salt particles to the opening for deposit in said pit, said shaft having vanes contacting and raking back and forth across the top of the baffle block for depositing gravitating salt particles in the pit, the upper end of the drum having a collar rotatable in bearing means at the top of the housing, a relatively stationary condenser, a rotary centrifugal salt particle separator head communicatively and rotatably connected with said drum and connected by flow means with said condenser, salt water supply means connected to said condenser, and a complemental flow means communicatively connected with and feeding and delivering salt water from said condenser to the interior of the drum for evaporation.

2. The combination of claim 1 wherein said separator head is supported and removably positioned between the condenser and the top of said drum for ready removal.

3. The combination of claim 1 wherein said separator head is removably positioned between the condenser and drum, said head comprising an insulated casing containing a plurality of radial, baffle-equipped horizontal tubes communicating with a depending vertical neck connected to the upper end of said drum by said collar, and an axially alined upstanding neck separably joined to the flow means connected to said condenser.

4. The combination of claim 1 wherein said salt water supply means comprises a conduit connected to a source of salt water and to said condenser, a filter in said conduit, a driven pump in said conduit between said filter and said condenser.

5. The combination of claim 1 wherein said complemental flow means comprises a second conduit extending into the vaporizing chamber of said drum and terminating in a spray nozzle, and a single prime mover operatively connected to said reciprocating shaft, separator head, and said pump.

6. A water purifying apparatus comprising, an outer insulated stationary housing, a vaporizing drum confined and mounted for rotation within said housing, means mounted in said housing for heating said drum, a salt water delivery conduit communicating with a source of salt water, a condenser fixedly supported above the top of said drum, said delivery conduit having a discharge end connected to an intake provided therefor in said condenser, rotatably supported salt particles separator means communicatively joined to said drum, flow means affording communication between a vapor discharge end of said drum and said condenser, a filter in said delivery conduit, a pump in said delivery conduit between said source of salt water and said condenser intake, a second conduit communicatively connected to said condenser and depending from the condenser and having a discharge end located within the said drum, a base underlying and supporting said housing and rotatably supporting said drum, said drum being constantly open at its bottom to permit gravitational discharge of salt particles, a scraper fixed to said base and having a portion thereof positioned in and conforming to an interior surface of said drum for dislodging and scraping material deposited upon said interior surfaces, a portion of the base beneath the open bottom of said drum being recessed and providing a trapping pit, said pit being aligned with said open bottom to trap salt particles deposited therein, said pit having an outlet, said pit being provided within the limits of the pit with a fixedly mounted baffle block, and block underlying and being spaced below the open bottom of said drum and being of an area greater than the cross-section of said open bottom, said base being provided with axially aligned bores on diametrically opposite sides of the pit and aligned with corresponding end portions of said baffle block, a reciprocating shaft having pistons thereon slidingly mounted in said bores, said shaft having vanes fixed thereon and contacting and movable back and forth across the top surface of the baffle block for raking and depositing gravitating salt particles into said pit, and means for reciprocating said shaft.

7. An apparatus for reclaiming fresh water from salt water comprising a stationary housing having a bottom wall with an opening therein, a cylindrical evaporator drum in said housing journaled for rotation about a vertical axis and having an opening in its bottom continuously registering with said housing opening, means sealing said registering openings from the atmosphere, operating means connected to said drum for rotating the latter, a vapor outlet means in the top of said drum, salt water inlet means extending into said drum through said registering openings and including a spray head disposed centrally within said drum, heating means in said housing surrounding said drum and heating the latter to water vaporizing temperature, a condenser into which said vapor outlet means discharges, said apparatus including a pit disposed beneath said housing bottom wall and with which said housing bottom opening continuously communicates for the passage of salt particles thereinto by gravity from said drum, a baffle in said pit having a top surface which is spaced beneath and whose periphery projects horizontally outwardly beyond the edges of the housing bottom opening, a scraper movably mounted in said pit and having vanes slidably engaging the top surface of said baffle and removing salt particles therefrom into said pit.

8. The combination of claim 7 wherein said scraper consists of a reciprocatable shaft having said vanes rigidly connected thereto in a longitudinally spaced side-by-side series, operating means connected to said scraper shaft and reciprocating the latter.

9. An apparatus for reclaiming fresh water from salt water comprising a stationary housing having a bottom wall with an opening therein, a cylindrical evaporator drum in said housing journaled for rotation about a vertical axis and having an opening in its bottom continuously registering with said housing opening, means sealing said registering openings from the atmosphere, operating means connected to said drum for rotating the latter, a vapor outlet means in the top of said drum, salt water inlet means extending into said drum through said registering openings and including a spray head disposed centrally within said drum, heating means in said housing surrounding said drum and heating the latter to water vaporizing temperature, a condenser into which said vapor outlet means discharges, said apparatus including a pit disposed beneath said housing bottom wall and with which said housing bottom opening continuously communicates for the passage of salt particles thereinto by gravity from said drum, a baffle in said pit having a top surface which is spaced beneath and whose periphery projects horizontally outwardly beyond the edges of the housing bottom opening, a scraper movably mounted in said pit and having vanes slidably engaging the top surface of said baffle and removing salt particles therefrom into said pit, said scraper consisting of a reciprocatable shaft having said vanes rigidly connected thereto in a longitudinally spaced side-by-side series, means connected to said scraper shaft and reciprocating the latter, transverse guide bores on opposite sides of and in alinement with said baffle top surface, said shaft having guide members thereon guidingly and slidingly received in sealed engagement in said bores.

References Cited in the file of this patent
UNITED STATES PATENTS

| | | |
|---|---|---|
| 158,764 | Wendel et al. | Jan. 12, 1875 |
| 823,488 | Barnstead | June 12, 1906 |
| 845,929 | Broonoippolito | Mar. 5, 1907 |
| 1,501,515 | Testrup | July 15, 1924 |
| 1,797,055 | Douthitt | Mar. 17, 1931 |
| 1,894,520 | Quiroz | Jan. 17, 1933 |
| 2,280,210 | Zellhoefer | Apr. 21, 1942 |
| 2,475,639 | Rainwater | July 12, 1949 |
| 2,521,442 | Birdseye | Sept. 5, 1950 |
| 2,537,259 | Cleaver et al. | Jan. 9, 1951 |
| 2,554,138 | Cross | May 22, 1951 |
| 2,731,149 | Findlay | Jan. 17, 1956 |
| 2,735,807 | Banker | Feb. 21, 1956 |
| 2,975,108 | Watt | Mar. 14, 1961 |
| 2,997,230 | Bouvy | Aug. 22, 1961 |
| 3,098,718 | Ferrari | July 23, 1963 |